Dec. 29, 1942.   C. L. WALKER   2,306,577
PNEUMATICALLY MOUNTED TRACTOR
Filed April 15, 1940
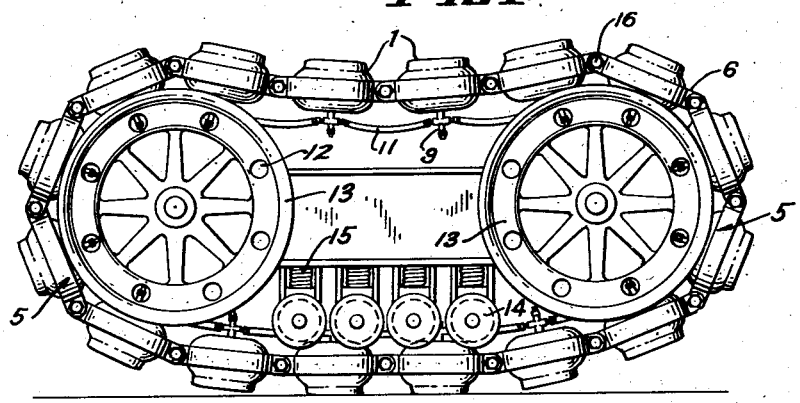
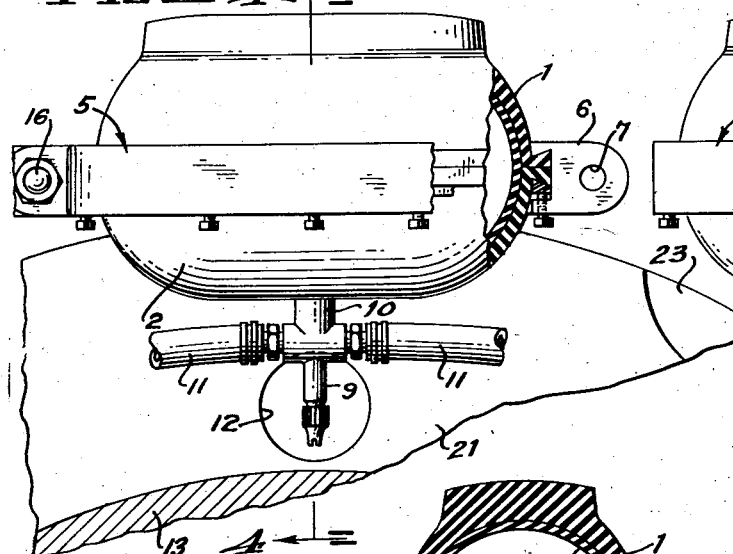
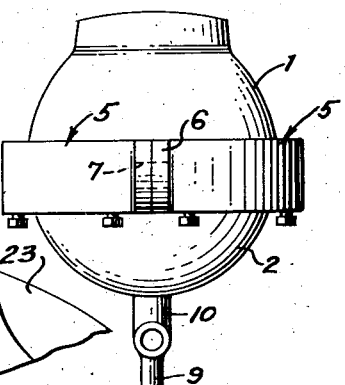
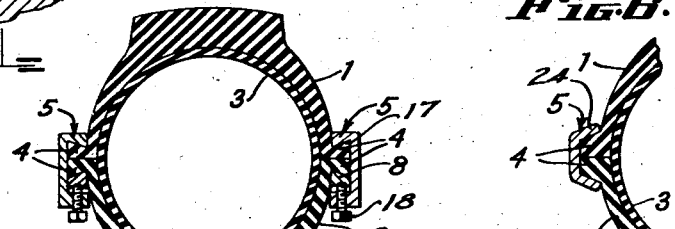
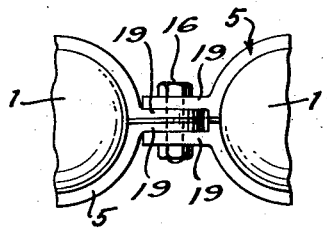
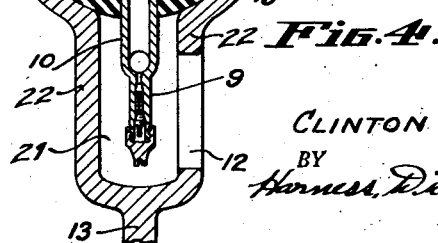
INVENTOR.
CLINTON L. WALKER
BY
ATTORNEYS.

Patented Dec. 29, 1942

2,306,577

UNITED STATES PATENT OFFICE 2,306,577

PNEUMATICALLY MOUNTED TRACTOR

Clinton L. Walker, Piedmont, Calif.

Application April 15, 1940, Serial No. 329,674

14 Claims. (Cl. 305—10)

My invention relates to track laying tractors, and particularly to a tractor having a track composed of pivoted links with pneumatic elements projecting on both the inner and outer sides thereof.

This application is a continuation in part of my co-pending application, Serial No. 271,093, filed May 1, 1939, in which I have illustrated, described, and claimed a tractor having a track thereon carrying interconnected pneumatic elements providing ground engaging surfaces which are supported on air. The present invention pertains to a track made up of links which retain separate halves of pneumatic elements together with each half projecting inwardly and outwardly of the links. The driving and supporting wheels of the tractor are formed to engage the inner pneumatic portions of the track to provide pneumatic support for the tractor. The wheels are pulley-like in form to provide clearance for the tubes projecting from the elements and their interconnecting conduits.

The driving wheels for the track have recessed portions which receive the inner pneumatic elements and provide a positive drive and resistance against slippage between the wheels and the track. The track is composed of elliptical links which are hinged together, the elliptical portion being employed to support the pneumatic elements. The elements are ellipsoidal in form and are composed of two casings having projecting flanges which are engaged and supported by the links. An inner tube is disposed within each of the casings from which a tube projects. All of the tubes are interconnected by conduits to permit the air to surge from one casing to the other. Each projecting tube carries a valve from any of which all of the pneumatic elements may be inflated or deflated.

Accordingly, the main objects of my invention are: to provide a tractor with a track which presents pneumatic contact with the ground and pneumatic support for the tractor; to provide a ground laying track made up of a plurality of open links which support pneumatic elements on either side thereof employed for engaging the ground and the wheels of the tractor; to provide a ground laying track made of elliptical links pivoted together and supporting pneumatic elements having tubes which are interconnected by conduits and mounted on wheels on a tractor which are formed to receive the elements and conduits when supporting the tractor entirely through the pneumatic elements; and in general, to provide a ground laying track providing complete pneumatic support for a tractor, which is simple in construction, positive in operation, and economical of manufacture.

Other objects and features of novelty of my invention will be either specifically pointed out or will become apparent when referring, for a better understanding of my invention, to the following description taken in conjunction with the accompanying drawing, wherein:

Figure 1 is a view in elevation of a ground laying track and the driving and supporting wheels of a tractor embodying my invention;

Fig. 2 is an enlarged view, with parts in section, illustrating the pneumatic element and supporting links therefor shown in Fig. 1;

Fig. 3 is an end view of the link and pneumatic element illustrated in Fig. 2;

Fig. 4 is an enlarged sectional view of the structure illustrated in Fig. 2, taken on the line 4—4 thereof;

Fig. 5 is an enlarged plan view of the pivot for a pair of links illustrated in Fig. 1; and Fig. 6 is a broken view of structure, similar to that illustrated in Fig. 4, showing a modified form of my invention.

In Fig. 1, I have illustrated the driving and supporting portion of a tractor having a ground laying track thereon comprising a plurality of oval-shaped links 5 which are pivoted together by bolts 16 to form a continuous track. The track encloses an area in which the supporting and driving mechanism is positioned as illustrated in Fig. 1. In the figure the area is illustrated as being substantially elliptical in form, and it is to be understood that I do not wish to be limited to this particular form of area. The oval-shaped links 5 receive a pair of pneumatic casings 1 and 2 having flanges 4 received by the inner recess 17 of the links 5. The flanges are dove-tail in shape, and a dove-tailed split ring 8 is forced against the flanges by a plurality of bolts 18.

The unit casing thus formed is provided with an inner tube 3 having a valve stem 10 which projects from the inner casing 2. The stem 10 of each of the tubes is connected to the stem of the adjacent tube by conduits 11 having large orifices to permit the rapid surge of air from one to the other of the elements. A valve stem portion 9 which projects from each of the stems 10 is provided with a Schrader type valve which permits the application of air to all of the pneumatic elements and prevents the air from escaping therefrom.

The links 5 are formed of two halves to permit their assembly on the casings. The projecting fingers 19 on one end of the links are disposed a greater distance apart than those on the other end of the links. This forms a bifurcated end which receives the opposite fingers of the adjacent link, as illustrated more clearly in Fig. 5. The track is supported and driven on a pair of wheels 13 having an annular recess 21 to permit the valve stems 9 and conduits 11 to pass freely between the flanges 22 thereof. Apertures 12 are provided in the outer side of the flange to render the valve stem 9 accessible.

The flanges 22 are shaped to form the rims 13 which are further recessed at 23 for receiving the casings 2 as they move thereabout. The recess 23 prevents slippage and engagement throughout the major portion of the outer surface of the casing. A plurality of wheels 14 support the weight of the tractor through the springs 15. The wheels 14 have recesses 21 for receiving the valve stems 9 and interconnecting conduits 11 as they roll thereby.

In this particular construction it will be noted that the ground engaging elements are entirely pneumatic, that the wheels of the tractor which drive and support the weight of the tractor on the ground laying track engage the inner portions of the pneumatic elements so that the weight of the tractor is supported entirely by pneumatic means. The driving of the elements is positive through the engagement of the pockets of the driving wheels with each of the pneumatic elements. This eliminates material wear and sound, and provides pneumatic support for the tractor, resulting in greater speed and longer life.

In Fig. 6, I have illustrated a further form of oval-shaped link 5, wherein the flanges 4 on the casings 1 and 2 converge outwardly to be mateable with the channel formed by the diverging flanges 24 on the link. When the links 5 are drawn together by the bolts 16, flanges 24 engage and force the flanges 4 of the casings tightly together. It is to be understood that other means for securing the flanges of the casings together can be substituted for those illustrated in Figs. 1 to 4 and 6, and that I do not, therefore, wish to be limited to the two specific constructions illustrated.

The interconnection of the casings permits the surge of air from one to the other so that when passing over obstructions no one casing will be subjected to more pressure than the other. The mounting of the two halves of the pneumatic units on the links which are retained in position by the bolts which pivot the links together permits the removal of any one of the links should the casing become worn or damaged. Thus, each individual element may be repaired without interfering with others of the elements. The rim on the tractor wheels and the driving wheels guides the track and retains it in position. The track provides complete pneumatic engagement with the tractor and ground and substantially no wear of metal parts or noise is produced thereby. The driving wheels are recessed to receive and encompass a greater portion of the surface of the inner casings which reduces wear and prevents slippage between the casing and the driving elements.

While I have described and illustrated but two embodiments of my invention, it will be apparent to those skilled in the art that various changes, omissions, additions and substitutions may be made therein without departing from the spirit and scope of my invention, as set forth in the accompanying claims.

What I claim is:

1. In a tractor, a ground laying track comprising a plurality of links pivoted together and forming an endless loop defining an area, a plurality of pneumatic elements each supported by one of said links and projecting from both sides thereof in the plane of said area, and wheels on said tractor engaging portions of the pneumatic elements projecting within said area while portions of the elements projecting on the other side of the links engage the ground.

2. In a tractor, an endless ground laying track made of a plurality of links enclosing an area, a pneumatic element supported by each link to extend on both sides thereof in the plane of said area, wheels on said tractor recessed to receive portions of said elements projecting within said areas while portions of said elements projecting from said links outwardly of said area contact the ground.

3. In a tractor, a pneumatic ground laying track comprising a plurality of pivoted links defining an area, a pneumatic element supported by each of said links and extending on both sides thereof in the plane of said area, conduits interconnecting the various pneumatic elements, and wheels on said tractor having recesses for the reception of said conduits and surfaces for engaging portions of said pneumatic elements projecting within the area to support and drive the tractor while portions of the elements extend outwardly of the links and area and engage the ground.

4. In a tractor, a ground laying track comprising, in combination, a plurality of links split in half and having projecting fingers, means on said link halves for receiving and engaging pneumatic elements, and pneumatic elements formed of a pair of flanged casings with the flanges abutting and secured by said links, and means for securing the projected fingers together to form a unit track.

5. In a tractor, a ground laying track comprising, in combination, a plurality of links split in half and having projecting fingers, means on said link halves for receiving and engaging pneumatic elements, pneumatic elements formed of a pair of flanged casings with the flanges abutting and secured by said links, means for securing the projected fingers together to form a unit track, inner tubes within said casings having valve stems projecting therefrom, and conduits interconnecting said valve stems between the valves thereof and the tubes.

6. In a tractor of the track laying type, a continuous track defining an area, longitudinally spaced pneumatic elements supported by said track with portions extending beyond the track into said area, and portions extending beyond said track outwardly of said area.

7. In a supporting and driving mechanism for a tractor, a rotatable member, means for driving said member, a plurality of resilient elements engaging said member and the ground and driven by the former, means encompassing said elements which are carried thereby between said member and the ground, and means pivoting said encompassing means together to form a continuous track.

8. In a tractor of the track laying type, a continuous track made of pivotal elements secured together, resilient members supported by said elements with portions extending entirely beyond both sides of said elements to form the sole driven and ground engaging portions of the track.

9. In a tractor of the track laying type, a continuous track made of pivotal elements secured together, resilient members supported by said elements with portions extending entirely beyond both sides of said elements to form the sole driven and ground engaging portions of the track, and driving means having recessed portions for receiving the portions of the members on the driven side of said track.

10. In a tractor of the track laying type, a continuous track made of pivotal elements secured together, pneumatic members supported by said elements near the mid-portion thereof to have portions of said members project entirely beyond both sides of said elements to form the sole driven and ground engaging portion of the track.

11. In a tractor of the track laying type, a continuous track made of pivotal elements secured together, pneumatic members supported by said elements near the mid-portion thereof to have portions of said members project entirely beyond both sides of said elements to form the sole driven and ground engaging portion of the track, and driving means having recessed portions for receiving the portions of the members on the driven side of said track.

12. In a tractor of the track laying type, a continuous track made of pivotal elements secured together, pneumatic members supported by said elements near the mid-portion thereof to have portions of said members project entirely beyond both sides of said elements to form the sole driven and ground engaging portion of the track, driving means having recessed portions for receiving the portions of the members on the driven side of said track, and individual valve stems projecting from said members on one side of said track.

13. In a tractor of the track laying type, a continuous track made of pivotal elements secured together, pneumatic members supported by said elements near the mid-portion thereof to have portions of said members project entirely beyond both sides of said elements to form the sole driven and ground engaging portion of the track, driving means having recessed portions for receiving the portions of the members on the driven side of said track, individual valve stems projecting from said members on one side of said track, and conducting means interconnecting said valve stems.

14. In a tractor of the track laying type, a track including pairs of U-shaped links of inwardly presenting channel section, engaging ends on said links by which they are secured together and pivoted on the ends of adjacent pairs of links, pairs of casings having mateable flanges supported in the channels of said pairs of links, and an inflatable tube in each of said pairs of casings.

CLINTON L. WALKER.